US012737791B2

(12) United States Patent
Goonetilleke

(10) Patent No.: US 12,737,791 B2
(45) Date of Patent: Sep. 15, 2026

(54) PREDICTING THE VALUE OF AN ASSET USING MACHINE-LEARNING TECHNIQUES

(71) Applicant: Alt Platform Inc., San Francisco, CA (US)

(72) Inventor: Don Goonetilleke, Oakland, CA (US)

(73) Assignee: Alt Platform Inc., San Francisco, CA (US)

( * ) Notice: Subject to any disclaimer, the term of this patent is extended or adjusted under 35 U.S.C. 154(b) by 0 days.

(21) Appl. No.: 18/537,606

(22) Filed: Dec. 12, 2023

(65) Prior Publication Data

US 2024/0112225 A1 Apr. 4, 2024

Related U.S. Application Data

(63) Continuation of application No. 17/494,688, filed on Oct. 5, 2021, now Pat. No. 11,887,168.

(51) Int. Cl.

| | |
|---|---|
| ***G06Q 30/02*** | (2023.01) |
| ***G06F 16/951*** | (2019.01) |
| ***G06F 18/23*** | (2023.01) |
| ***G06N 20/00*** | (2019.01) |
| ***G06Q 30/0601*** | (2023.01) |

(52) U.S. Cl.

CPC ....... *G06Q 30/0278* (2013.01); *G06F 16/951* (2019.01); *G06F 18/23* (2023.01); *G06N 20/00* (2019.01); *G06Q 30/0643* (2013.01)

(58) Field of Classification Search

CPC ............................... G06F 16/951; G06F 18/23

See application file for complete search history.

(56) References Cited

U.S. PATENT DOCUMENTS 10,242,320 B1 3/2019 Elkholy et al.
10,860,836 B1 * 12/2020 Tyagi .................... G06N 3/084

(Continued)

FOREIGN PATENT DOCUMENTS

WO WO 2016/164326 A1 10/2016
WO WO 2018/067978 A1 4/2018
WO WO 2018/148493 A1 8/2018

OTHER PUBLICATIONS

Breton, R. et al. "Research Indices Using Web Scraped Data," Office for National Statistics UK, Jan. 9, 2015, pp. 1-22.

(Continued)

*Primary Examiner* — Vincent M Cao
(74) *Attorney, Agent, or Firm* — Fenwick & West LLP

(57) ABSTRACT

A system and a method are disclosed for a platform that determines the classification of a physical asset received from a provider. For a physical asset, the platform extracts intrinsic data from the asset and compiles extrinsic data by web scraping data associated with the asset. The platform generates a principal component vector comprising the intrinsic data and extrinsic data and inputs the principal component vector into a machine learning model. The machine-learning model is trained using training data that includes an aggregation of principal components of a physical asset as labeled by a historical classification and a time associated with the entry. The machine-learning model outputs the classification of the physical asset corresponding to a present time. The platform provides the classification to a user in visual association with a representation of the physical asset.

18 Claims, 7 Drawing Sheets

(56) References Cited

U.S. PATENT DOCUMENTS

| | | | | |
|---|---|---|---|---|
| 2010/0235270 | A1 | 9/2010 | Baker | |
| 2013/0271487 | A1 | 10/2013 | Lincoln | |
| 2015/0127430 | A1* | 5/2015 | Hammer, III | G06Q 30/0206 705/7.35 |
| 2016/0019610 | A1 | 1/2016 | Willis et al. | |
| 2016/0210734 | A1 | 7/2016 | Kass et al. | |
| 2018/0168515 | A1* | 6/2018 | Farahmand | G06N 20/00 |
| 2019/0012442 | A1* | 1/2019 | Hunegnaw | G06V 40/161 |
| 2020/0057769 | A1 | 2/2020 | Kass et al. | |
| 2020/0082168 | A1 | 3/2020 | Fathi et al. | |
| 2020/0273131 | A1* | 8/2020 | Martin, Jr. | G06Q 10/0833 |
| 2021/0065353 | A1 | 3/2021 | Potter et al. | |
| 2021/0073449 | A1* | 3/2021 | Segev | G06F 30/27 |
| 2021/0304121 | A1* | 9/2021 | Lee | G06F 40/284 |
| 2021/0315639 | A1* | 10/2021 | Manucherhabadi | A61B 34/10 |
| 2022/0044298 | A1* | 2/2022 | Oshinaike | G06V 20/52 |
| 2023/0005055 | A1* | 1/2023 | Chen | G06N 20/00 |

OTHER PUBLICATIONS

PCT International Search Report and Written Opinion, PCT Application No. PCT/US22/45665, Jan. 31, 2023, 15 pages.

* cited by examiner

100

Alternate Classification System
100

Example Asset
200

400

PREDICTING THE VALUE OF AN ASSET USING MACHINE-LEARNING TECHNIQUES

CROSS REFERENCE TO RELATED APPLICATIONS

This application is a continuation of U.S. application Ser. No. 17/494,688, filed Oct. 5, 2021, now U.S. Pat. No. 11,887,168, which is incorporated by reference in its entirety.

TECHNICAL FIELD

This disclosure generally related to machine learning and, more specifically, the determining classifications of physical objects using machine learning models.

BACKGROUND

Classifications of an asset may fluctuate over time in response to various external circumstances and conditions. For example, where the asset is a related to an athlete, attributes of the asset (e.g., popular interest in the asset, media mention of the asset, etc.) may increase as the player performs well or decrease as the player's performance declines. Accordingly, the classification of an asset based on its attributes over time cannot be modeled using conventional systems, as they fail to consider such external factors.

Additionally, even if conventional systems were to consider such external factors, the sheer volume of available external circumstances and conditions that may factor into the classification of an asset wound render such a task impractical, given the processing power and network resources required to gather and process the external factors. More specifically, training such a conventional system to consider these external factors in a manner robust enough to reliably predict the present classification of an asset would be neither practical nor computationally efficient.

SUMMARY

Embodiments of a disclosed system, method, and computer-readable storage medium includes predicting a classification of an asset using a combination of machine-learning models and techniques. The classification of a particular asset may be related to external factors collected continuously over the span of several years, external factors collected for a range of related assets, or both. The result is a robust dataset of external factors that conventional classification systems are incapable of processing in a computationally efficient manner. Additionally, the classification of an asset may fluctuate over time given a combination of various real-time external conditions. For example, the classification of an asset may increase or decrease as the asset becomes popularized by current social and economic events or conditions. Accordingly, the classification of an asset is adjusted based on time to account for such dynamic events or conditions.

The systems and methods disclosed herein describe an asset classification system capable of handling such a robust amount of data and account for such dynamic events or conditions in a computationally efficient manner. To accommodate the robust volume of extrinsic data compiled for a particular physical asset, the asset classification platform implements various techniques to consolidate and optimize the volume of compiled data. The asset classification platform aggregates combinations of attributes or features of extrinsic data into principal components of the asset, for example market trends, which are ultimately input to the machine-learned model. The asset valuation platform may reduce the volume of compiled extrinsic data by filtering out a subset of the high importance components of the extrinsic data and encoding principal components from the filtered subset. The asset valuation platform may additionally cluster assets based on shared attributes of intrinsic data to optimize the efficiency with which extrinsic data may be collected for a particular asset.

An asset classification platform extracts intrinsic data from a physical including an identifier of the asset, a subject of the asset, and a time (e.g., a particular moment in time or a range of times) associated with the asset. The asset classification platform compiles a set of extrinsic data based on the intrinsic data by web scraping data associated with the intrinsic data from third-party servers. The asset value platform generates a principal component vector from the intrinsic data and extrinsic data and inputs the principal component vector into a machine-learned model. The machine-learned model is trained to output a classification of the physical asset corresponding to the present time. The asset classification platform provides the classification for display to a user in visual association with a representation of the asset.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture for Asset Valuation Platform

Figure 1:
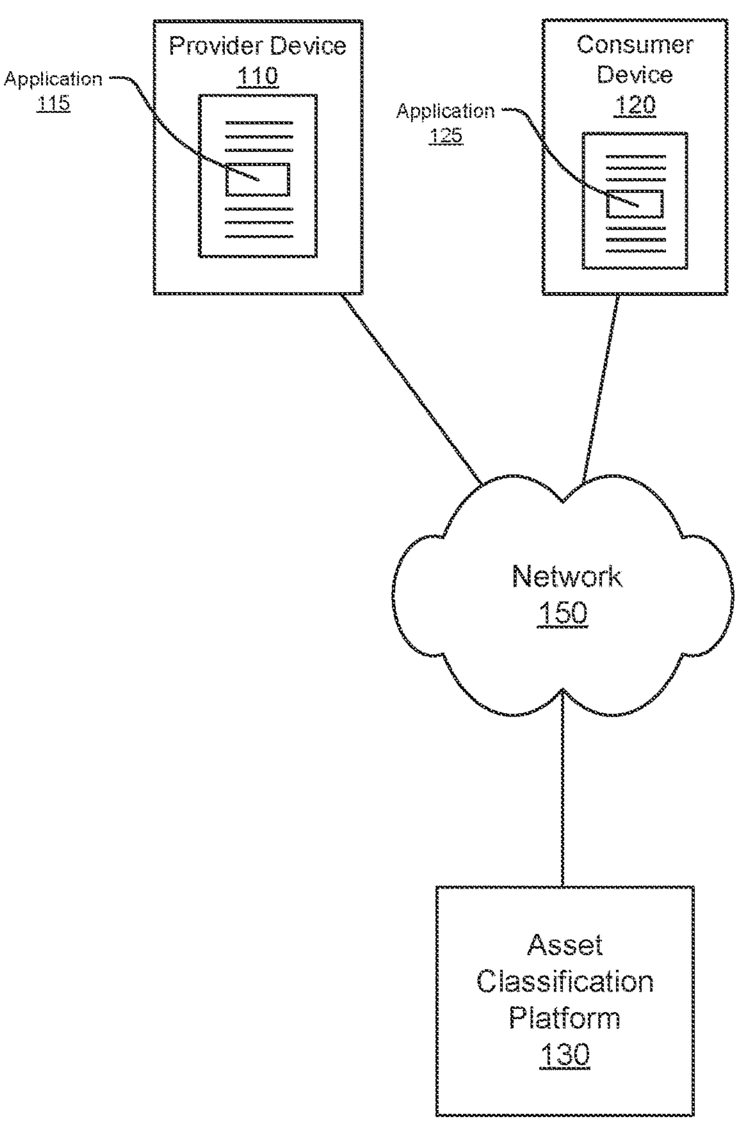
FIG. 1 illustrates a system architecture for an alternate classification system, according to an embodiment.

FIG. 1 illustrates a system architecture for an alternate classification system 100, according to an embodiment. The system 100 includes a provider device 110, with an application 115 installed thereon, a consumer device 120, with an application 125 installed thereon, an asset classification platform 130, and a network 150. However, in other embodiments, the system 100 may include different and/or additional components. Here only one provider device 110, consumer device 120, and asset classification platform 130 are illustrated, but there may be multiple instances of each of these entities. The functionality of the asset classification platform 130 may be distributed, or replicated, across multiple servers.

The provider device 110 is a computing device with data processing and data communication capabilities, capable of receiving inputs from a provider. The provider device 110 may be operated by an end-point user, hereafter referred to as a provider, to enter data and images of an asset to create a record of the asset in the asset valuation platform. An example physical implementation is described more completely below with respect to FIG. 4. The provider device 110 may be a computing device such as smartphones with an operating system such as ANDROID® or APPLE® IOSO, tablet computers, laptop computers, desktop computers, electronic stereos in automobiles or other vehicles, or any other type of network-enabled device on which digital content may be listened to or otherwise experienced. The provider device 110 may include functionality, which allows the device 110 to record speech responses articulated by a provider operating the device (e.g., a microphone), and to graphically present data to a provider (e.g., a graphics display). In addition, typical client devices include the hardware and software needed to input and output sound (e.g., speakers and microphone) and images, connect to the network 150 (e.g., via Wifi and/or 4G or other wireless telecommunication standards), determine the current geographic location of the provider device 110 (e.g., a Global Positioning System (GPS) unit), and/or detect motion of the provider device 110 (e.g., via motion sensors such as accelerometers and gyroscopes).

The application 115 provides a user interface, hereafter referred to as a "provider dashboard," which is displayed on a screen of the provider device 110. Among other functions, the provider dashboard enables providers to list assets to be classified by the asset valuation platform, list assets to be stored by the asset valuation platform, or a combination thereof. For example, through the application 115, a provider may capture an image of an asset and supply the image and other details regarding the asset to the asset classification platform 130. In this way, the application 115 enables a provider to list an asset in the asset classification platform 130 and review the classification determined by the asset classification platform 130.

As described herein, "classification" by the asset classification platform 130 is the result of inputting attributes extracted from and compiled for an asset into a machine-learned model to characterize the asset in a manner that provides insight to both providers and consumers. An asset may be classified according to a predicted popularity of the asset or level of consumer interest in the asset, a rarity of the asset, a condition of the asset, a value of the asset, or a price of the asset. The classification of an asset maybe a numerical label characterizing or representing the asset or a verbal label characterizing or representing the asset. Given the dynamic nature of an asset's classification, the classification of an asset represents a prediction regarding the asset at a particular point in time or range of times. Accordingly, an asset may be characterized over time by tracking fluctuations in the asset's classification over a range of times.

In addition to providing the provider dashboard, the application 115 may also perform some data processing on images and information provided by the user using the computational resources of the provider device 110 before sending the processed data to the asset classification platform 130 through the network 150. Data sent through the network 150 is received by the asset classification platform 130 where it is analyzed and processed for storage and retrieval in conjunction with a database. The application 115 may be a dedicated application installed on provider device 110, or a service provided by the asset classification platform 130 that is accessible by a browser or other means.

The provider device 110 is a computing device with data processing and data communication capabilities that is capable of receiving inputs from a provider. The provider device 110 may be operated by an end-point user to enter data and images of an asset to create a record of the asset in the asset valuation platform.

Similarly, a consumer device 120 is a computing device with data processing a data communicating capabilities, which is capable of receiving input from a consumer, for example user viewing a listing of an asset stored on the asset classification platform 130. The consumer device 120 may be operated by an end-point user to browse listings of assets stored in the asset valuation platform, which include a representation of the asset and the classification of the asset, whether defined manually by a provider or determined by the asset classification platform 130. The above description of the functionality of the provider device 110 also describes the consumer device 120.

Similarly, the application 125 provides a user interface, hereafter referred to as a "consumer dashboard," which is displayed on a screen of the provider device. Among other functions, the consumer dashboard enables users to browse and select assets and listings of assets. In this way, the application 115 enables a user to view and interact with listings of an asset stored at the asset classification platform 130. The above description of the application 115 also describes the application 125.

The asset classification platform 130 determines the classification of an asset at a present time based on a combination of intrinsic data extracted from an image of the asset and extrinsic data pertaining to the asset compiled from various remote servers. Particulars of the functionality of the asset classification platform 130 are further discussed below with reference to FIGS. 3-6.

Interactions between the provider device 110, the consumer device 120, and the asset classification platform 130, are typically performed via the network 150, which enables communication between the provider device 110, the consumer device 120, and the platform 130. In one embodiment, the network 150 uses standard communication technologies and/or protocols including, but not limited to, links using technologies such as Ethernet, 700.11, worldwide interoperability for microwave access (WiMAX), 3G, 4G, LTE, digital subscriber line (DSL), asynchronous transfer mode (ATM), InfiniBand, and PCI Express Advanced Switching. The network 150 may also utilize dedicated, custom, or private communication links. The network 150 may comprise any combination of local area and/or wide area networks, using both wired and wireless communication systems.

As described herein, an asset refers to any physical object, which may be listed on a server by a provider and viewed by a consumer. Examples of assets include, but are not limited to, trading cards, apparel and accessories, jewelry, bottled beverages, figurines, literature, or any other physical object listed by a provider. For the sake of illustration, the techniques and processes described herein are described with reference to trading cards.

Figure 2:
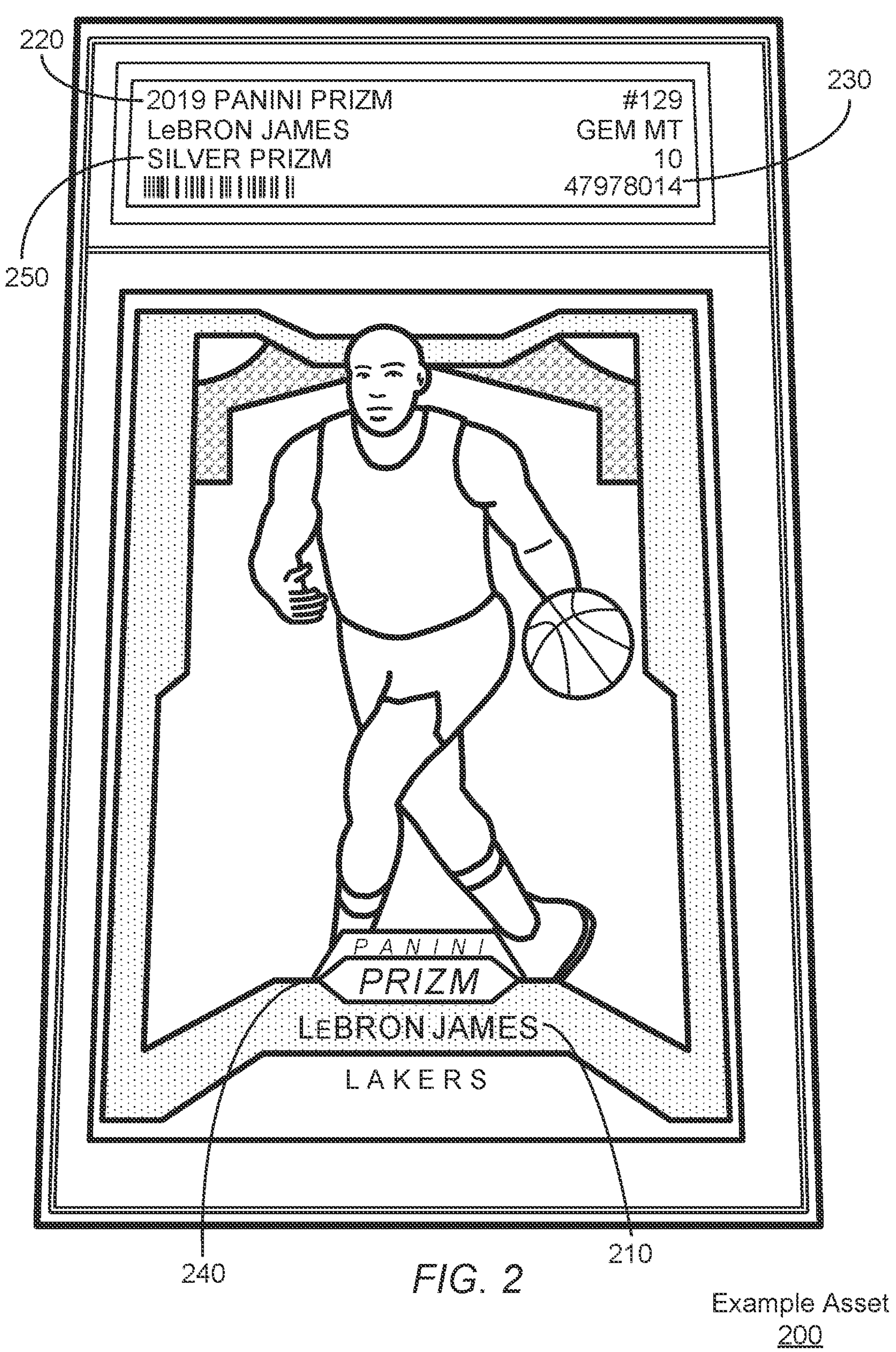
FIG. 2 is an illustration of an example of a physical asset that is a trading card, according to an embodiment.

FIG. 2 is an illustration of an example of a physical asset that is a trading card, according to an embodiment. In the illustrated embodiment of FIG. 2A, the subject 210 of the trading card is printed directly on the front of the card. With regards to the example asset 200, the subject of the asset is the name of the player "Lebron James." The time 220 associated with the print of the card is listed on the label attached to the card but may alternatively be printed directly on the card. The asset 200 was printed in the year 2019. In addition to the subject 210 and the time 220, an asset may be identified using a unique identification code 230. With regards to the asset 200, the unique identification code is a numerical designation, but the identification code may alternatively be listed as a scannable bar code or QR code. The brand 240 of an asset may be designed on the asset itself or or on the label attached to the asst. With regards to the asset 200, the brand 240 is designated on the card above the subject 210, as well as on the attached label adjacent to the time 220. The variety 250 of the asset 200 may be verbally designated on the label attached to the trading card. The variety of the asset 200 (a trading card) is "SILVER." The variety of a trading card may also be identified based on visual features of the card, for example the color of the card or whether the card is holographic. Such visual features may be analyzed using any suitable image analysis technique. The variety 250 of an asset is further discussed below with regards to FIG. 3.

Predicting the Value of an Asset Using an Asset Valuation Platform

The asset classification platform 130 maintains extrinsic and intrinsic data assigned to assets stored in the asset classification platform and determines the current classification of assets stored in the platform 130. The current classification of an asset may be determined at periodic intervals, in response to a request from a provider of the asset, in response to a request from a consumer viewing a listing of the asset, or a combination thereof.

Figure 3:
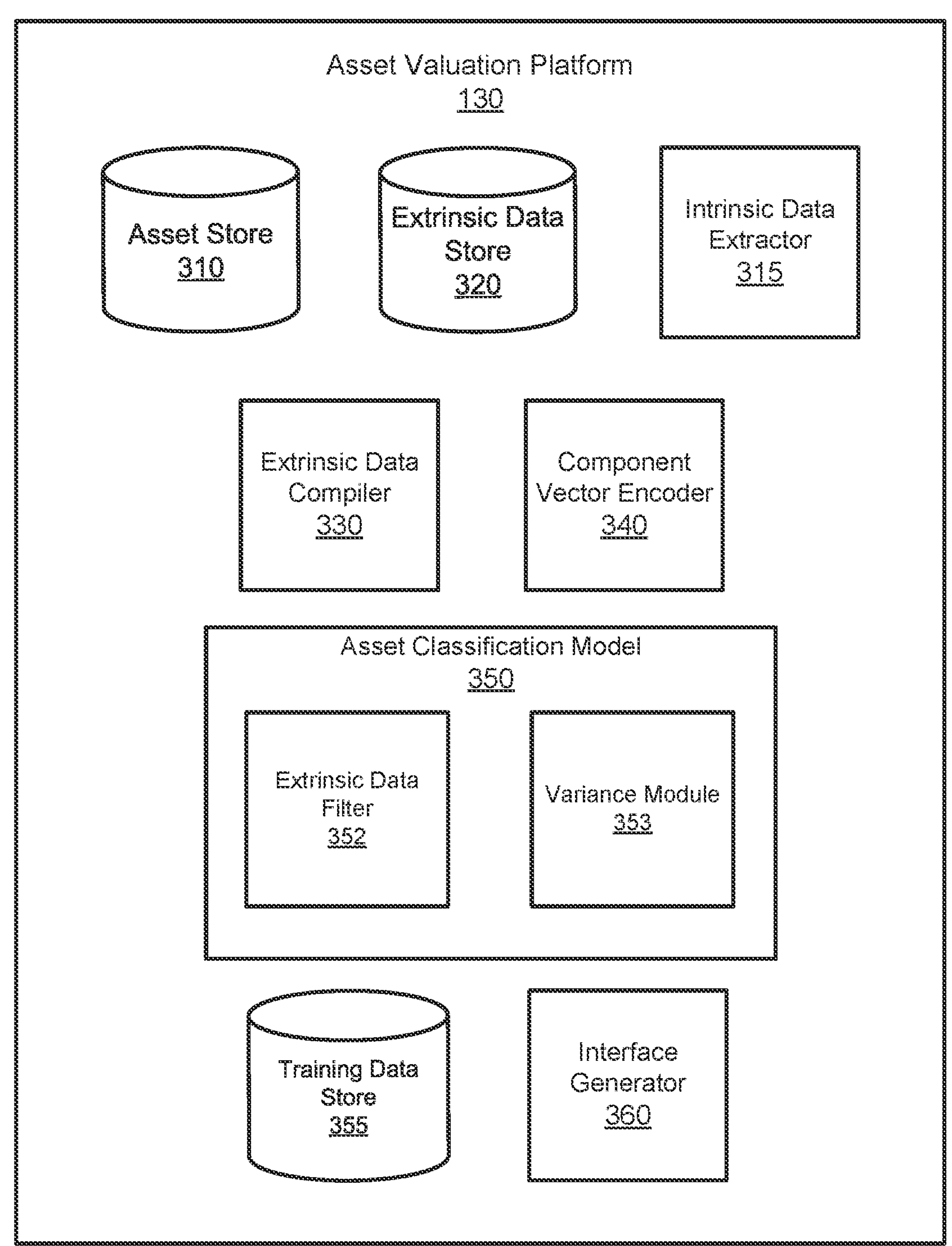
FIG. 3 is a block diagram of the system architecture of the asset classification platform 130, according to an embodiment.

FIG. 3 is a block diagram of the system architecture of the asset classification platform 130, according to an embodiment. The asset classification platform 130 illustrated in FIG. 3 includes an asset store 310, an extrinsic data store 320, an extrinsic data compiler 330, a component vector encoder 340, an asset classification model 350, a training data store 355, and an interface generation 360. However, in other embodiments, the asset classification platform 130 may include different and/or additional components.

The asset store 310 maintains a record of assets submitted by providers to the asset classification platform 130 and intrinsic data extracted from each asset. As described herein, intrinsic data refers to visually identifiable information of the asset. Intrinsic data includes, but is not limited to, an identifier of the asset, a subject of the asset, a time associated with the asset, and visual or inherent properties of the asset, for example images on the asset, colors or discoloration, defects of the asset or damages to the asset. Intrinsic data additionally refers to information inherent to an asset, for example the brand of the asset or a variety of the asset. The intrinsic data extractor 315 may extract intrinsic data from an image of the asset, for example using image analysis techniques described below.

As described herein, a "variety" of an asset refers to a rarity-based model of the asset where rarer versions (or models) of an asset are ranked higher than more abundant versions (or models) of the same asset, for example a gold-colored trading card compared to a silver or bronze-colored card. As described herein, the ranking of differing varieties of assets may be based on the classifications of assets discussed above. In addition to information inherent to the asset itself, intrinsic data may additionally include information inherent to the subject of the asset. For example, where the asset is a sports trading card, intrinsic data may additionally include, but is not limited to, the player's position, their age at the start of a season, their draft position—all of which are attributes, which will remain unchanged during the course of time.

The intrinsic data extractor 315 extracts intrinsic data from an asset and the extracted data is stored in the asset store 310 in association with the asset itself. In one embodiment, the asset store 310 is organized into lookup tables for mapping particular assets to the intrinsic data extracted for the particular asset. In some embodiments, a provider submits an image of an asset to the asset classification platform 130 or the intrinsic data extractor 315 accesses an image of the asset stored at a third-party server. The intrinsic data extractor 315 may apply the visual analysis techniques described below to the submitted images to extract intrinsic data. Alternatively, the component vector encoder 340, further discussed below, encodes a component vector directly from the accessed image of the asset.

In some embodiments, a provider submits the asset itself to the asset classification platform 130. The intrinsic data extractor 315 extracts intrinsic data from the asset, for example using an optical sensor to identify one or more visual features of the asset. The intrinsic data extractor 315 extracts intrinsic data from the identified visual features of the asset, for example using an optical character recognition algorithm or any other suitable visual analysis technique. Intrinsic data extracted from the asset includes, but is not limited to, a subject of the asset, a unique identifier of the asset, and a time associated with the asset.

The subject of the asset refers to a label on the asset. For example, if the asset were a sports trading card, the subject would refer to the name of the player on the trading card. Alternatively, if the asset were a bottled beverage, the subject would refer to the name of the beverage. The unique identifier of the asset characterizes the asset on a more granular level than the subject of the asset, for example the manufacturer of the asset, the model of the asset, and any identifiers assigned to the asset by the manufacturer. Continuing from the sports trading card example, the unique identifier may describe the brand of the card, the type of card, and the serial number assigned to the card. Continuing from the bottled beverage example, the unique identifier may describe the company manufacturing the beverage and the store-keeping unit (SKU) code. The time associated with the asset may refer to a time when the asset was produced or was first circulated on the market. Continuing from the sports trading card example, the time may describe the year assigned to the card (e.g., a 2020 Rookie Card). Continuing from the bottled beverage example, the time may describe the year when the beverage was bottled by the manufacturing company.

The extrinsic data store 320 maintains a record of extrinsic data compiled for and associated with a particular asset and timestamps assigned to each entry of extrinsic data describing when the entry was compiled. As described herein, extrinsic data represents events or circumstances that would impact or affect the classification of an asset, for example historical prices of the asset, current events or news related to the asset. The extrinsic data compiler 330 may compile extrinsic data for a present time from one or more remote servers, for example using web scraping data techniques. Where extrinsic data for the present time is unavailable, the extrinsic data compiler 330 may access historical extrinsic data compiled at an earlier time.

The extrinsic data compiler 330 may extract extrinsic data including, but are not limited to, odds defined by betting markets (e.g., a player's odds to win an seasonal award or the player's odds to win a championship), the player's current ranking for the season, the player's projected ranking at the end of the seasons, the player's current performance statistics, the player's projected performance statistics. Beyond a player's statistical performance, extrinsic data may describe a player's injury status and, if they are injured, a projected impact of the injury on the classification of an asset associated with the player. The asset classification model 350, further discussed below, may evaluate such a projected impact by identifying players who have historically suffered the same injury and the impact of the injury on the classifications of assets associated with those players. Beyond the player's performance with regards to their sport, the extrinsic data compiler 330 may extract extrinsic data referring to the player's popularity including, but not limited to, their current following on individual social media platforms, a projection of the future followings on such platform given their level of activity on the platforms, sponsorships, and contract information. For example, the trading card of a player on the last year of their contract who is also expected to sign a new contract with a high-profile team may receive a higher classification given the player's pending move to the higher-profile team.

Even beyond the player themselves, the extrinsic data compiler 330 may extract extrinsic data including macrolevel information that affects the valuation of a particular category or type of assets, for example the inflation rate, unemployment rate, or performance of the stock market. For example, during a range of time when people are spending more time at home, the classification of assets related to the home may receive a higher classification.

As discussed above, the classification of an asset fluctuates over time, increasing or decreasing in response to current events or conditions in the real-world. For example, the year a player wins the Most Valuable Player award, the classification of the trading card for the player during that year will increase. Alternatively, the year a player sits out due to injury, the classification of their trading card will decrease. Accordingly, the extrinsic data compiler 330 compiles extrinsic data for an asset at a present time to determine the classification of the asset at the present time. The extrinsic data compiler 330 transmits extrinsic data gathered for an asset to the component vector encoder 340. The component vector encoder 340, in turn, generates principal components of the asset from the transmitted extrinsic data and encodes those principal components into a format to be input to a machine-learned model, for example a feature vector. As described herein, such a feature vector is referred to as a "component vector."

As discussed above, extrinsic data for a particular asset may be compiled from various remote, third-party servers. In some embodiments, the extrinsic data compiler 330 implements web scraping techniques to search through third-party remote servers for extrinsic data pertinent to the classification of an asset. In compiling data from third-party servers, the extrinsic data compiler 330 may query databases of information stored across third-party servers for extrinsic data relevant to the asset itself or the classification of the asset.

When compiling extrinsic data, the extrinsic data compiler 330 queries the extrinsic data store 320 for extrinsic data recorded during a time (or range of time) immediately preceding or including the time (or range of time) at which the classification of the asset is being determined. As described herein, the time at which the classification of the asset is being determined is referred to as a "present time." For example, the extrinsic data compiler 330 may search for extrinsic data particularly recorded during the week preceding the present time. When such data is available, the extrinsic data compiler 330 determines whether the particular extrinsic data satisfies a threshold amount of extrinsic data.

In one embodiment, the extrinsic data compiler determines the threshold amount of data based on error metrics determined based on the performance of the model, for example the instances where the classification predicted for an asset differs from the actual, or an actual classification of the asset. The extrinsic data compiler may also determine error metrics based on instances where the classification predicted for an asset is rejected in favor of a classification received from a provider user. If the particular extrinsic data satisfies the threshold, the extrinsic data compiler 330 transmits the extrinsic data to the component vector encoder 340, which generates one or more principal components of the asset and encodes a principal component vector from the one or more principal components. In some embodiments, the extrinsic data compiler 330 implements multiple thresholds and categorizes the compiled extrinsic data based on the threshold satisfied by the compiled extrinsic data.

In implementations where the particular extrinsic data does not satisfy the threshold, the extrinsic data compiler 330 accesses webpages known to contain or previously labeled as containing extrinsic data pertinent to a particular asset or a general category of the asset and queries third-party servers associated with the webpages, for example using the web-scraping techniques discussed above, to extract additional extrinsic data recorded during a time (or range of time) preceding the present time. Continuing from the illustrative embodiment involving a trading card for a player, the extrinsic data compiler 330 may search through webpages of news articles involving, among other things, the player, the player's most recent statistical performances, betting odds related to the player, or the current health of the player. The extrinsic data compiler 330 aggregates any extrinsic data identified at the third-party servers with the previously identified extrinsic data and, again, compares the amount of identified extrinsic data to the threshold amount of extrinsic data. If the amount of identified extrinsic data now satisfies the threshold amount of extrinsic data, the extrinsic data compiler 330 transmits the extrinsic data to the component vector encoder 340.

If the amount of identified extrinsic data still does not satisfy the threshold amount of extrinsic data, the extrinsic data compiler 330 may query third-party servers for historical extrinsic data associated with the asset at an earlier time. For example, the extrinsic data compiler 330 compiles extrinsic data for a player's 2021 trading card but is unable to compile extrinsic data collected for the card in the past week. Accordingly, the extrinsic data compiler 330 may search the extrinsic data store 320 and third-party remote servers for extrinsic data collected for the player's 2021 trading card at times prior to the past week. The extrinsic data compiler 330 may transmit the extrinsic data from the prior times to the component vector encoder 340 to generate principal components of the asset.

Alternatively, or in addition to the techniques discussed above, the extrinsic data compiler 330 may search the extrinsic data store 320 and/or third-party remote servers for extrinsic data assigned to one or more secondary assets. As described herein, a secondary asset refers to an asset sharing attributes of intrinsic data with a particular asset. Given an asset produced during a current time, the extrinsic data compiler 330 may identify a secondary asset identified as a version or model of the asset produced during an earlier time. Continuing from the example above involving a player's 2021 trading card, a secondary asset may be the same player's 2020 trading card. In such circumstances, the secondary asset (e.g., the player's 2020 trading card) shares at least the subject of the particular asset (e.g., the player's 2021 trading card). In addition to the subject of the asset, a secondary asset may also be the same variety and brand of card as the particular asset, for example a different player's card of the same classification or variety-based ranking. Alternatively, the extrinsic data compiler 330 may identify secondary assets as assets of the same brand, variety, or both, even if they do not share the same subject. In such embodiments, the extrinsic data compiler 330 may extract extrinsic data from the identified secondary assets and transmit the extrinsic data to the component vector encoder 340 to generate principal components of the asset.

In yet another embodiment, the extrinsic data compiler 330 may search the extrinsic data store 320 for third-party remote servers for secondary assets sharing inherent intrinsic data with an asset. Continuing from the example above involving the player's 2021 trading card, the extrinsic data compiler 330 may identify secondary assets as cards for players playing at the same position or players with comparable performances or statistics during previous years. As another example, at the start of a player's rookie season, extrinsic data will be unavailable given that the player has yet to begin playing or that the player has not played enough games to have collected sufficient data. Accordingly, the extrinsic data compiler 330 may access extrinsic data for rookie players from previous years who were drafted at the same draft position, played the same position, had comparable performances during their rookie season, had similar social media followings and publicity, or a combination thereof.

In some embodiments, the extrinsic data compiler 330 identifies secondary assets using a combination of the techniques discussed above. For example, where extrinsic data extracted for an asset is insufficient to satisfy the threshold amount of extrinsic data, the extrinsic data compiler 330 may identify a first set of secondary assets sharing the same subject as the asset and a second set of secondary assets sharing a threshold amount of intrinsic data with the asset excluding the subject. In such embodiments, the extrinsic data compiler 330 may extract extrinsic data from both sets of secondary assets and transmit the extracted data to the component vector encoder 340.

In some embodiments, the extrinsic data compiler 330 may apply the techniques discussed above for aggregating enough extrinsic data to satisfy the threshold amount of extrinsic data in a cascading, sequential manner (e.g., querying third-party servers for extrinsic data assigned to an asset before querying servers for extrinsic data assigned to secondary assets). In other embodiments, the extrinsic data compiler 330 may apply the techniques discussed above in parallel to maximize the volume of extrinsic data available to the component vector encoder.

The extrinsic data compiler 300 may evaluate data compiled from various remote servers over time to generate a market level trend of the asset. When enough extrinsic data is available, the extrinsic data compiler 330 may generate market level trends for a particular asset, for example a trading card for a particular player. To generate the market level trend, the extrinsic data compiler 330 accesses historical classifications of the asset determined or recorded at various times or ranges of times preceding the present time. The extrinsic data compiler 330 may access historical classification of the asset from extrinsic data store 320 such that each historical classification represents a classification determined by the asset classification platform 130 during a time preceding the present time. Alternatively, the extrinsic data compiler 330 may access historical classifications from third-party servers such that each historical classification represents a classification of an asset determined for a previous listing involving the asset. Historical classifications determined for previous listings may additionally be stored directly at the extrinsic data store 320.

In such implementations, the extrinsic data compiler 330 accesses historical classifications of a particular asset at various time preceding the present time. The extrinsic data compiler 330 may access historical classifications of the particular asset from extrinsic data store 320 such that each historical classification represents a classification determined by the asset classification platform 130 for an asset during a time preceding the present time. Alternatively, the extrinsic data compiler 330 may access historical classifications from third-party servers such that each historical classification represents a classification determined for a previous listing involving an asset. Such historical classifications may additionally be stored directly at the extrinsic data store 320.

The component vector encoder 340 receives extrinsic data extracted by the extrinsic data compiler and intrinsic data of an asset and generates a component vector from the received data. A component vector is a representation of classification data for an asset during a present time, which may be processed by a machine-learned model to determine a classification of the asset during the present time. To that end, the component vector encoder 340 analyzes extrinsic data and intrinsic data to generate principal components of the asset, which comprise the component vector.

"Principal components" describe variables (e.g., extrinsic and intrinsic information compiled for an asset) to be input to a machine learned model, for example the asset classification model 350 discussed below, to predict the value of an asset. Described differently, principal components are numerical representations of the various inputs that the model processes to output a classification, for example extrinsic and intrinsic data. Each feature of the principal component vector represents a principal component of the asset, which may be determined based on the extrinsic and instruction data.

The principal component vector is input to the machine-learning model, which outputs a classification of the asset corresponding to a present time. The machine-learning model is train ed based on a training dataset including a population of assets and, for each asset of the training dataset, an aggregation of principal components as labeled by a historical classification and a time associated with the entry. During training, the asset classification model 350 derives parameter values of the model 350. Further, the training dataset stored in the data store 351 is used to define the parameter values during a particular time, whereas the principal components are continuously generated based on extrinsic data and intrinsic data compiled for an asset during a present time.

Particular attributes of classification data may themselves be principal components of a component vector. For example, the component vector encoder 340 may identify intrinsic data such as the identifier of the asset, the subject of the asset, the time associated with the asset, and the present time for which the classification is being determined as principal components. In addition, the component vector encoder 340 may encode extrinsic data such as a classification of the asset listed on a third-party remote server during the current time as a principal component.

The component vector encoder 340 may additionally generate a principal component describing a market trend of the classification of the asset based on the available classification data. To generate the market trend, the component vector encoder 340 tracks fluctuations in the classification of an asset over time, for example a timeline, based on extrinsic data gathered during historical range of time (or historical time) preceding the present time. In addition, the component vector encoder 340 may draw correlations between the classification of an asset during a historical range of time with extrinsic data extracted during that historical range. Accordingly, the component vector encoder 340 generates principal components of the asset based on correlations between extrinsic data describing a player's performance, a player's health, a player's social medial following, and macro-level circumstances and a known classification of an asset. Using principal components extracted from such market trends, the asset classification model 350 may determine a classification of an asset at a present time based on the extrinsic data compiled for the present time.

As discussed above, the extrinsic data compiler 330 may extract extrinsic data for secondary assets sharing the same subject and brand as the asset but differ in variety. To accommodate for the difference in varieties between an asset and a secondary asset, the component vector encoder may determine a conversion relationship between the classification determined for a first variety based on the classification determined for a second variety under the same conditions. For example, a first variety of trading cards may be designed as "blue" cards, indicating that 200 copies of the particular card were printed. A second variety of trading cards may be designated as "gold" cards, indicating that only 10 copies of the particular card was printed. Accordingly, by comparing the classification of the first variety of a player's trading card during several historical time times to the classification of the second variety of the same player's trading card during the same historical times, the component vector encoder 340 may extract a relationship, which enables the asset classification model 350 to determine the classification of an asset based on historical classifications of secondary assets of a different variety, but the same subject. By applying the conversion relationship to a known classification of an asset of a first variety, the asset classification model 350 may triangulate the classification of an asset with the same subject, but a second variety.

In some embodiments, such a relationship may be modeled using a linear scaling factor. In other embodiments, the conversion relationship may be modeled using a non-linear model. Such a non-linear model may be suitable as the classification of a less rare variety of an asset increases. Returning to the example above regarding the blue variety of trading card and the rarer gold variety of trading card, when the blue variety is classified at $100, the gold variety of the same player's card may be four times the classification of the blue variety. However, if the blue variety were classified at $20,000, the gold variety of the same player's card may be ten times the classification of the variety. Accordingly, the component vector encoder 340 may access the classification of the least rare variety of an asset or the rarest variety of the asset before determining whether to apply a linear scale factor or a non-linear model to determine. If the least rare variety of the asset is assigned a classification exceeding a first threshold, the component vector encoder 340 encodes a principal component representing a non-linear conversion relationship. Similarly, if the rarest variety of the asset is assigned a classification exceeding a second threshold, the component vector encoder 340 encodes a principal component representing the non-linear conversion relationship. Otherwise, the component vector encoder 340 may encode a principal component vector representing a linear scale factor.

As described above, the asset classification platform 130 applies machine-learning based techniques to predict a classification of the asset based on a combination of intrinsic data extracted from the asset and extrinsic data associated with the asset accessed from third-party remote servers. In particular, the asset classification model 350 is used to analyze principal components generated for an asset to predict a classification of the asset. In the embodiment illustrated in FIG. 3, the asset classification model 350 comprises or otherwise utilizes an extrinsic data filter 352, and a variance module 353. However, in other embodiments, the asset classification model 350 may include different and/or additional components.

To predict the classification of an asset during a present time, the asset classification model 350 may be a mathematical function or other more complex logical structure, trained using a combination of extrinsic and intrinsic data stored in the training data store 355 to determine a set of parameter values stored in advance and used as part of the classification analysis. As described herein, the term "model" refers to the result of the machine learning training process. Specifically, the asset classification model 350 describes the function for predicting the classification of an asset and the determined parameter values incorporated into the function. "Parameter values" describe the weight associated with at least one of the featured principal components.

The asset classification model 350 is trained using a training dataset made up of large volumes of historical extrinsic data and intrinsic data recorded for a significant volume of assets. Each entry of the training dataset, stored in the training data store 355, represents an asset with labeled with a known classification of the asset, which may also be referred to as a "classification label." An entry in the training data store 355 further includes a unique identifier of the asset mapped to time at which the classification label was recorded and a combination of principle components encoded by the component vector 340 that contributed to the known classification label. An entry in the training data store 355 may further intrinsic data extracted from the asset corresponding to the entry, for example a physical condition of the asset, a rarity of the asset, or any other intrinsic or extrinsic data that contributed to the classification label of the asset at that time. Accordingly, the training data store 355 includes labeled training data (e.g., classification labels) corresponding to the same asset at various times and similar, secondary assets at different times. During training, the asset classification model 350 determines parameter values for each principal component input to the asset classification model 350 by analyzing and recognizing correlations between the principal components associated with an entry and the labeled classification of the entry.

As classifications are confirmed by providers, the training data store 355 may be continuously updated with entries pertaining to newly listed assets. Accordingly, the asset classification model 350 may be iteratively trained based on the updated data in the training data store 355 to continuously improve the accuracy of classificaitons output by the asset classification model 350.

In some embodiments, entries within the training dataset stored represent assets from a range of categories, for example a trading card, a bottled beverage, artwork, and more. The asset classification model 350 trained on such a training dataset may act as a baseline model, which may be implemented to determine the classification of an asset in a particular category. In such embodiments, the baseline model may be further trained using a particularized training dataset comprised of training data for a particular category of assets. Accordingly, a baseline asset classification model may be further trained to predict the classification of a particular category of asset.

Periodically, the training dataset in the data store 351 may be updated with entries of novel assets or updated classifications extracted from already existing assets. Accordingly, the asset classification model 350 may be iteratively trained by inputting the principal components of the existing and novel assets such that the model 350 continues to learn and refine its parameter values based on the new and updated data points. Iteratively re-training the asset classification model 350 in the manner discussed above allows the model 350 to more accurately predict the classification of an asset based on the principal components generated for the asset.

To improve the processing efficiency of the asset classification platform 130, the extrinsic data filter 352 may filter the amount of extrinsic data compiled by the extrinsic data compiler 330 based on the times during which each entry of extrinsic data was collected. Given that the more recently collected extrinsic data will have a greater influence on the current classification of an asset, the extrinsic data compiler 352 may determine whether enough data was collected during a range of time including the present time. If enough extrinsic data was collected during the present time, the extrinsic data filter 352 may remove all extrinsic data collected before the present range of time from the component vector encoder 350. Accordingly, the component vector encoder 340 encodes only principal components based only on data collected during the present range of time and the asset classification model 350 predicts the classification of an asset based only on data collected during the present range of time.

For example, to determine the classification of an asset in July 2021, the extrinsic data compiler 330 may compile extrinsic data collected from January 2021 through July 2021. However, the extrinsic data filter 352 may determine whether a threshold amount of a data was collected for July 2021. As described herein, the threshold amount of extrinsic data represents an amount of data from which principal components of an asset can be extracted to accurately predict the classification of the asset. If the amount of extrinsic data collected for July 2021 satisfies the threshold amount, the extrinsic data filter 352 may remove extrinsic data collected before July 2021 and generate principal components from only the July 2021 data. In this manner, the extrinsic data filter 352 may efficiently reduce the volume of extrinsic data to be processed by the asset classification model 350 without affecting the performance of the model 350. In alternate embodiments, extrinsic data filter 352 may identify a specified number of the most recent transactions of an asset (e.g., the twenty most recent transactions for an asset) and may remove any transactions recorded prior to the identified number.

The extrinsic data filter 352 may additionally identify particular times or ranges of times where insufficient extrinsic data or records of transactions have been compiled. The sufficiency of extrinsic data may be determined based on a comparison to a threshold amount of data or using any other suitable mechanism. For times where insufficient data is compiled, the extrinsic data filter 352 may generate and transmit a request for an operator to manually search for and record extrinsic data. Such manually generated data may be referred to as "synthetic data."

As discussed above, the asset classification model 350 outputs a prediction of the classification of an asset. However, the predicted classification output by the model 350 for a present time may differ from the actual classification of an asset during the present time. Such discrepancies may arise due to variances between the listings of the same asset. For example, with regards to a first listing, an asset may be assigned a classification representative of its true classification. In a second listing, the same asset may be assigned a classification higher than its true classification due to competing interests between two users who are not sensitive to the actual classification of the asset. To identify such outliers (e.g., the second listing in the example above), the variance module 353 identifies outlier listing by performing variance analyses across all listing of an asset for which extrinsic data was compiled. In some embodiments, upon identifying an outlier listing, the variance module 352 requests confirmation from a manual operator that outlier listing was appropriately labeled as such.

In one embodiment, the variance model 353 is a distinct machine—is trained based on prediction error metrics determined for the asset classification model 350. The asset classification model 350 may determine prediction error metrics of the asset classification model 350 during training of the model 350 where the classification generated by the model 350 for an entry in the training dataset differs from the assigned classification label. The asset classification model 350 may also determine prediction error metrics based on instances where the classification predicted for an asset does not match a classification of the asset stored at a third-party server, where the classification predicted for the asset is rejected by a providing user, where the classification predicted for the asset is inconsistent with the classification offered by a consuming user, or any other suitable circumstances. In another embodiment, the variance model may be trained using quality regression forest methodology or any other suitable methodology.

The asset classification platform 130 may further comprise a clustering model (not shown) trained to organize assets into clusters within the asset data store 310 based on shared or comparable intrinsic data. Accordingly, each cluster generated by the clustering model includes assets sharing at least one attribute of intrinsic data or a particular combination of attributes of intrinsic data. For example, the clustering model may group assets based on a time assigned to the asset (e.g., trading cards from the same year but for different players), based on common variety and brand, or based on a common subject (e.g., trading cards with the same player but different time, brands, or varieties). In some embodiments, the clustering model may be trained to cluster assets on more granular levels, for example assets from the same variety and same time or assets from the same time and the same subject. By clustering assets in the asset store 310 using a clustering model, the extrinsic data compiler 330, component vector 340, and asset classification model 350 may apply the techniques discussed above in a more computationally efficient manner by maintaining and updating a record of secondary assets assigned to a particular an asset. For example, rather than applying the extrinsic data compiler 330 to the entire dataset stored within the extrinsic data store 320, the extrinsic data compiler 330 may extract extrinsic data from a smaller dataset corresponding to a particular cluster of assts.

The clustering model is trained to receive a principal component vector for an asset stored within the asset database 310 and assign the asset to a cluster of assets sharing a threshold number of attributes of intrinsic data. Accordingly, in some embodiments, the clustering model compares the principal components representing intrinsic data of a first asset to those of a second asset to determine whether the first and second asset share a threshold number of attributes of intrinsic data. If the threshold number of attributes is satisfied, the clustering model groups the first asset and the second asset into a cluster within the asset database 310. As discussed above, when determining the classification of an asset, the extrinsic data compiler 330 identifies a cluster to which the asset is assigned and, if necessary, may extract extrinsic data from other assets grouped into the identified cluster.

The interface generator 360 generates and transmits graphical user interfaces to provider devices 110 and consumer devices 120. When the asset classification model 350 predicts the classification of an asset, the interface generator 360 generates and transmits a graphical user interface, hereafter referred to as a "provider interface," to a provider device 120 of the provider of the asset. The provider interface displays the predicted classification of the asset and the identifier of the asset. In some embodiments, the provider interface may additionally include an image of the asset, intrinsic information extracted from the asset, a record of the present time for which the classification of the asset was predicted, or a combination thereof. The provider interface may additionally include a selectable graphical element enabling the provider to accept the predicted classification and list the asset for sale to consumers. The provider interface may additionally include a selectable graphical element enabling the provider to reject, or revise, the predicted classification and manually define a classification for the asset.

The interface generator 360 may additionally generate and transmit graphical user interfaces to consumer devices 120, hereafter referred to as a "consumer interface." Such consumer graphical user interfaces may display a listing of an asset which includes an image of the asset, an identifier of the asset, a listed classification of the asset, additional intrinsic information of the asset, or a combination thereof. The consumer interface may additionally include selectable graphical elements which enable a consumer to navigate through the purchasing of the asset, or alternatively request additional information regarding the listed asset.

Figure 4:
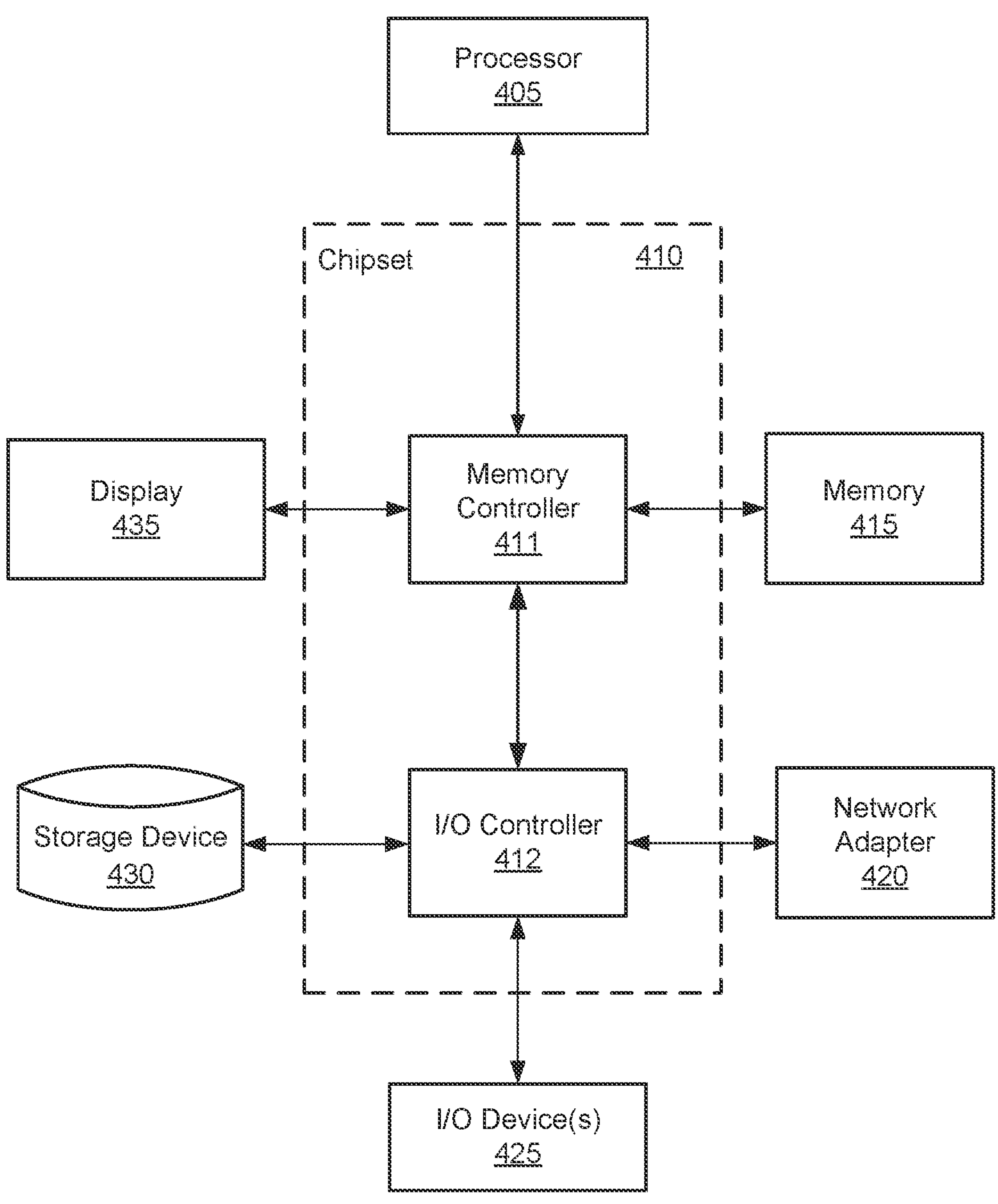
FIG. 4 is a block diagram illustrating components of an example machine able to read instructions from a machine-readable medium and execute them in a processor (or controller), according to an embodiment.

FIG. 4 is a high-level block diagram illustrating physical components of an example computer 200 that may be used as part of the provider device 110, the consumer device 120, the asset classification platform 130 from FIG. 1, according to one embodiment. Illustrated is a chipset 410 coupled to at least one processor 405. Coupled to the chipset 210 is volatile memory 415, a network adapter 420, an input/output (I/O) device(s) 425, a storage device 430 representing a non-volatile memory, and a display 435. In one embodiment, the functionality of the chipset 410 is provided by a memory controller 411 and an I/O controller 412. In another embodiment, the memory 415 is coupled directly to the processor 405 instead of the chipset 410. In some embodiments, memory 415 includes high-speed random access memory (RAM), such as DRAM, SRAM, DDR RAM or other random access solid state memory devices.

The storage device 430 is any non-transitory computer-readable storage medium, such as a hard drive, compact disk read-only memory (CD-ROM), DVD, or a solid-state memory device. The memory 415 holds instructions and data used by the processor 405. The I/O device 425 may be a touch input surface (capacitive or otherwise), a mouse, track ball, or other type of pointing device, a keyboard, or another form of input device. The display 435 displays images and other information from for the computer 400. The network adapter 420 couples the computer 400 to the network 150.

As is known in the art, a computer 400 can have different and/or other components than those shown in FIG. 4. In addition, the computer 400 can lack certain illustrated components. In one embodiment, a computer 400 acting as platform 130 may lack a dedicated I/O device 242525, and/or display 418. Moreover, the storage device 430 can be local and/or remote from the computer 400 (such as embodied within a storage area network (SAN)), and, in one embodiment, the storage device 430 is not a CD-ROM device or a DVD device.

Generally, the exact physical components used in a device 110 or 120 will vary in size, power requirements, and performance from those used in the platform 130. For example, devices 110 and 120, which will often be home computers, tablet computers, laptop computers, or smart phones, will include relatively small storage capacities and processing power, but will include input devices and displays. These components are suitable for user input of data and receipt, display, and interaction with notifications provided by the platform 130. In contrast, the platform 130 may include many physically separate, locally networked computers each having a significant amount of processing power for carrying out the asthma risk analyses introduced above. In one embodiment, the processing power of the platform 130 provided by a service such as Amazon Web Services™.

As is known in the art, the computer 400 is adapted to execute computer program modules for providing functionality described herein. A module can be implemented in hardware, firmware, and/or software. In one embodiment, program modules are stored on the storage device 430, loaded into the memory 415, and executed by the processor 405.

Figure 5:
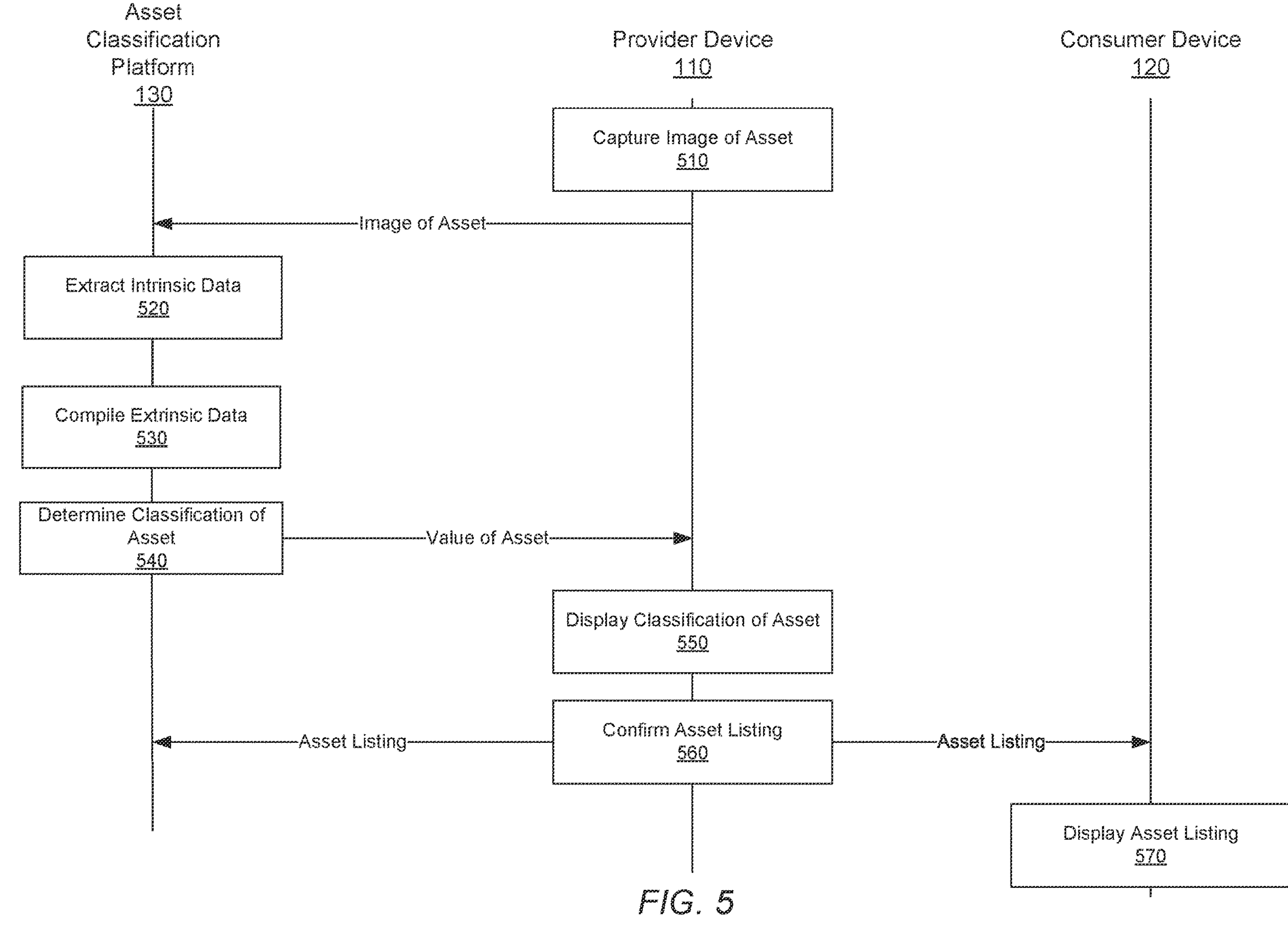
FIG. 5 is an interaction diagram illustrating the communication of data between devices of the alternate classification system, according to an embodiment.

FIG. 5 is an interaction diagram illustrating the communication of data between devices of the alternate valuation system, according to an embodiment. As an initial step, a provider captures 410 an of an asset using a provider device 110. The provider device 110 transmits the captured image to the asset classification platform 130. Upon receiving the image of the asset, the asset classification platform 130 extracts 420 intrinsic data from the asset, for example using the optical character recognition and image analysis techniques discussed above. Based on the extracted intrinsic data, the asset classification platform 130 compiles 430 extrinsic data based on the intrinsic data extracted from the image of the asset. When compiling extrinsic data, the asset classification platform 130 may apply web-scraping techniques to third-party remote servers to extract extrinsic information for the asset for a present time, historically collected extrinsic data for the asset, and, if necessary, extrinsic information for one or more secondary assets.

The asset classification platform 130 determines 440 the classification of the asset by generating principal components of the asset for the present time from the compiled extrinsic data and extracted intrinsic data and inputting the principal components to a machine-learned asset classification model 350. To implement the asset classification model 350, the asset classification platform 130 may encode the generated principal components in a component vector, which the asset classification model 350 is trained to process. The output of the trained model is a predicted classification of the asset.

The classification of the asset may be transmitted to the provider device 110, which displays 450 the classification\ of the asset to a provider via a provider application 115 or the provider interface discussed above. Using the graphical interface elements discussed above, the provider may approve the predicted classification or revise the predicted classification of the asset to confirm 560 the asset listing. The listing is transmitted to both the asset classification platform 130 and the consumer device 120. While the listing is stored at the asset classification platform 130, the listing may be displayed 570 to a consumer via a consumer application or a consumer interface discussed above to allow the consumer to review the listing.

Figure 6:
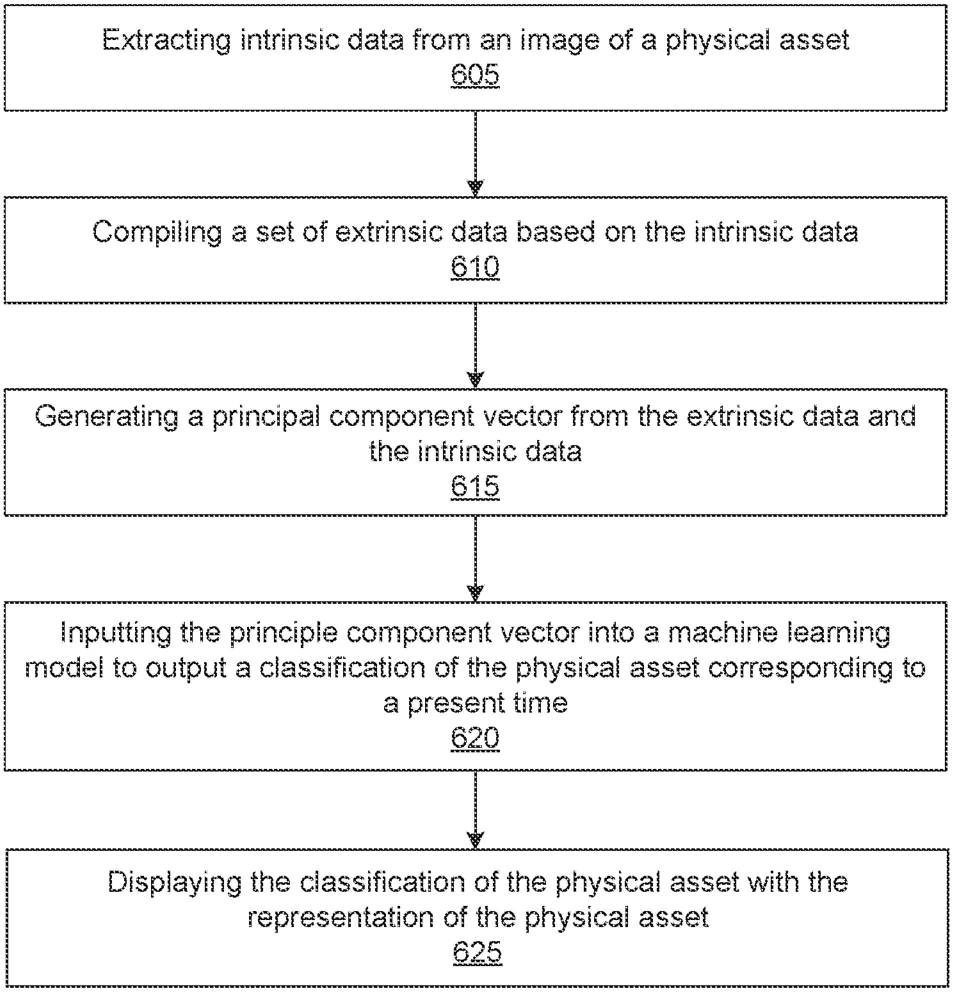
FIG. 6 is an exemplary data flow for determining the classification of a physical asset during a given time, according to an embodiment.

FIG. 6 is an exemplary data flow for determining a classification of an asset during a given time, according to an embodiment. As discussed above with reference to FIGS. 3 and 5, an intrinsic data extractor 315 extracts 605 intrinsic data from an image of an asset. In alternate embodiments, the intrinsic data extractor 315 extracts intrinsic data from the asset itself. As discussed above, intrinsic data refers to features of the asset inherent to the asset itself, for example a subject of the asset, a unique identifier of the asset, and a brand or variety of the asset.

Based on the extracted intrinsic data, the extrinsic data compiler 330 compiles 610 extrinsic data associated with the asset. As described herein, extrinsic data refers to events, conditions, or circumstances reflecting or impacting the classification of an asset. In compiling extrinsic data for an asset, the extrinsic data compiler 330 may search third-party remote servers for previous listings involving the asset and the classifications of the asset in those previous listings. The extrinsic data compiler 330 may also compile extrinsic data related to the subject of the asset, such as statistical performances, betting odds, popularity, current events, and even macrolevel economic factors that would influence the classification of the asset. Such extrinsic data may be used to triangulate the classification of the asset during a present time. The extrinsic data compiler 330 may collect all extrinsic data available during a time including a present time and all historical extrinsic data from preceding times. Where insufficient amounts of extrinsic data may be found for a particular asset, the extrinsic data compiler 330 may identify secondary assets—assets which share a threshold amount of intrinsic data components with a particular asset—and additionally extract extrinsic data associated with the secondary assets.

The component vector encoder 340 generates 615 a principal component vector from the extracted intrinsic data (605) and the compiled extrinsic data (610). The compiled extrinsic data and extracted intrinsic data are further processed into principal components of the classification of the asset, for example a market trend of the asset's classification. More generally, the principal component vector encodes extrinsic data and intrinsic data into a format capable of being processed by a machine-learning model in a computationally efficient manner.

The principal component vector is input to a machine-learned asset classification model 350 trained to predict a classification of the asset at the present time. The asset classification model 350 is trained using a training dataset where each entry in the training dataset represents an asset, an aggregation of principal components of the asset, and a label for the asset identifying a known, historical classification of the asset and a time when the historical classification was determined. The classification of the asset predicted by the asset may be displayed to both consumers and the provider of the asset in conjunction with a visual representation of the asset.

Computing Machine Architecture

Figure 7:
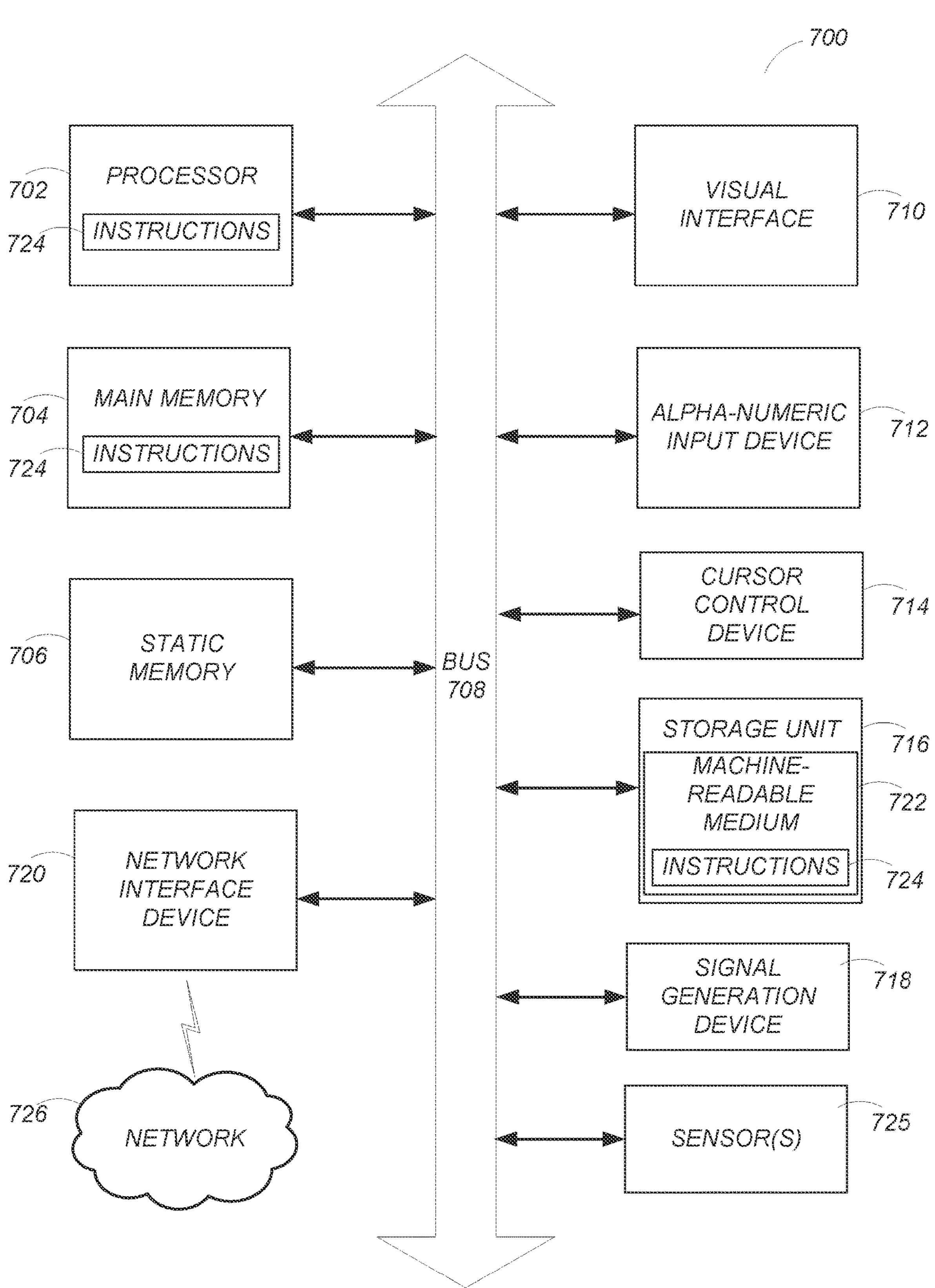
FIG. 7 is a block diagram illustrating components of an example machine able to read instructions from a machine-readable medium and execute them in a processor (or controller), according to an embodiment.

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may be comprised of instructions 724 executable by one or more processors 700. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 700 includes a processor 700 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include visual display interface 710. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 700 may also include alphanumeric input device 712 (e.g., a keyboard or touch screen keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 700 (e.g., within a processor's cache memory) during execution thereof by the computer system 700, the main memory 704 and the processor 700 also constituting machine-readable media. The instructions 724 (e.g., software) may be transmitted or received over a network 826 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for predicting claim outcomes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
- accessing a training dataset of training data, each entry of training data including an aggregation of intrinsic data extracted from a physical asset corresponding to the entry labeled by a historical classification and a time associated with the entry;
- updating the training data set with extrinsic data for each entry of the training dataset, wherein updating the training dataset comprises:
  - identifying a range of time including a present time;
  - responsive to determining that an amount of entries of the training data set having a respective time associated with the entry during the range of time exceeds a threshold, identifying a set of extrinsic data for entries within the range of time and excluding entries that are outside of the range of time;
  - compiling the set of extrinsic data based on the intrinsic data, the extrinsic data acquired by web scraping data associated with the intrinsic data; and
  - updating the entry with the extracted intrinsic data;
- inputting the updated training dataset to a machine-learning model to determine a difference between an output of the machine-learning model and a corresponding label for each entry of the updated training dataset;

updating parameter values of the machine-learning model for principle components of the training data based on the determined difference for each of the updated training dataset, wherein the machine-learning model is trained using the updated parameter values to output classifications of a physical asset based on one or more of: a subject of the physical asset, a time associated with the physical asset, and extrinsic data collected for the physical asset;

inputting a principal component vector to the updated machine-learning model, wherein the principal component vector comprises intrinsic data extracted from a physical asset and extrinsic data compiled for the physical asset; and receiving, as output from the updated machine-learning model, a classification of the physical asset corresponding to a present time.

2. The method of claim 1, further comprising:

for a given entry of the training dataset, extracting intrinsic data from the physical asset corresponding to the entry, the intrinsic data including an identifier of the asset, a subject of the asset, and a time associated with the asset; and updating the given entry of the training dataset with the extracted intrinsic data.

3. The method of claim 2, wherein extracting intrinsic data from the physical asset corresponding to the entry comprises:

identifying, by an optical sensor, one or more visual features of the physical asset; and inputting the one or more visual features to an optical character recognition algorithm to extract the identifier of the asset, the subject of the asset, and a time associated with the asset from the one or more visual features.

4. The method of claim 1, wherein compiling the set of extrinsic data based on the intrinsic data comprises:

querying a database to identify particular extrinsic data assigned to the physical asset at a time preceding a present time; and responsive to identifying extrinsic data assigned to the asset at a prior time, updating a corresponding entry of the training dataset with the extracted intrinsic data.

5. The method of claim 1, wherein compiling the set of extrinsic data based on the intrinsic data comprises:

determining whether the extrinsic data satisfies a threshold amount of extrinsic data;

responsive to determining the extrinsic data to be less than the threshold amount of extrinsic data, accessing web pages containing extrinsic data associated with the asset;

extracting extrinsic data from each web page listed on the accessed web pages during the present time; and updating a corresponding entry of the training dataset with the extracted intrinsic data.

6. The method of claim 1, further comprising:

querying a database server to identify extrinsic data assigned to the physical asset at a time preceding the present time;

determining whether the identified extrinsic data satisfies a threshold amount of extrinsic data;

responsive to determining the identified extrinsic data to be less than the threshold amount of extrinsic data, identifying one or more secondary assets stored in the database, wherein each of the one or more secondary assets share at least the subject of the physical asset; and updating a corresponding entry of the training dataset with the identified one or more secondary assets.

7. The method of claim 1, further comprising:

grouping assets stored in the training dataset into clusters, wherein each cluster comprises a plurality of assets sharing at least one component of intrinsic data; and storing each clusters of similar assets in the training dataset.

8. The method of claim 1, further comprising:

identifying one or more outliers of the training dataset, wherein outliers represent entries of training dataset where the labeled historical classification deviates from an actual classification of the corresponding physical asset at the time associated with the entry; and removing the one or more outliers from the training dataset.

9. A non-transitory computer readable storage medium comprising stored instructions, which when executed by at least one processor, cause the processor to:

access a training dataset of training data, each entry of training data including an aggregation of intrinsic data extracted from a physical asset corresponding to the entry labeled by a historical classification and a time associated with the entry;

update the training data set with extrinsic data for each entry of the training dataset, wherein updating the training dataset comprises instructions that cause the processor to:

identifying a range of time including a present time;

responsive to determining that an amount of entries of the training data set having a respective time associated with the entry during the range of time exceeds a threshold, identifying a set of extrinsic data for entries within the range of time and excluding entries that are outside of the range of time;

compile the set of extrinsic data based on the intrinsic data, the extrinsic data acquired by web scraping data associated with the intrinsic data; and update the entry with the extracted intrinsic data;

input the updated training dataset to a machine-learning model to determine a difference between an output of the machine-learning model and a corresponding label for each entry of the updated training dataset;

update parameter values of the machine-learning model for principle components of the training data based on the determined difference for each of the updated training dataset, wherein the machine-learning model is trained using the updated parameter values to output classifications of a physical asset based on one or more of: a subject of the physical asset, a time associated with the physical asset, and extrinsic data collected for the physical asset;

input a principal component vector to the updated machine-learning model, wherein the principal component vector comprises intrinsic data extracted from a physical asset and extrinsic data compiled for the physical asset; and receive, as output from the updated machine-learning model, a classification of the physical asset corresponding to a present time.

10. The non-transitory computer readable medium of claim 9, wherein instructions for extracting intrinsic data from a physical asset further cause the processor to:

for a given entry of the training dataset, extract intrinsic data from the physical asset corresponding to the entry, the intrinsic data including an identifier of the asset, a subject of the asset, and a time associated with the asset; and update the given entry of the training dataset with the extracted intrinsic data.

11. The non-transitory computer readable medium of claim 10, wherein instructions for extracting intrinsic data from a physical asset further cause the processor to:

identify, by an optical sensor, one or more visual features of the physical asset; and input the one or more visual features to an optical character recognition algorithm to extract the identifier of the asset, the subject of the asset, and a time associated with the asset from the one or more visual features.

12. The non-transitory computer readable medium of claim 9, wherein instructions for compiling the set of extrinsic data based on the intrinsic data further cause the processor to:

query a database to identify particular extrinsic data assigned to the physical asset at a time preceding a present time; and responsive to identifying extrinsic data assigned to the asset at a prior time, update a corresponding entry of the training dataset with the extracted intrinsic data.

13. The non-transitory computer readable medium of claim 9, wherein instructions for compiling the set of extrinsic data based on the intrinsic data further cause the processor to:

determine whether the extrinsic data satisfies a threshold amount of extrinsic data;

responsive to determining the extrinsic data to be less than the threshold amount of extrinsic data, access web pages containing extrinsic data associated with the asset;

extract extrinsic data from each web page listed on the accessed web pages during the present time; and update a corresponding entry of the training dataset with the extracted intrinsic data.

14. The non-transitory computer readable medium of claim 9, wherein instructions for compiling the set of extrinsic data based on the intrinsic data further cause the processor to:

query a database server to identify extrinsic data assigned to the physical asset at a time preceding the present time;

determine whether the identified extrinsic data satisfies a threshold amount of extrinsic data;

responsive to determining the identified extrinsic data to be less than the threshold amount of extrinsic data, identify one or more secondary assets stored in the database, wherein each of the one or more secondary assets share at least the subject of the physical asset; and update a corresponding entry of the training dataset with the identified one or more secondary assets.

15. The non-transitory computer readable medium of claim 9, further comprising instructions that cause the processor to:

group assets stored in the training dataset into clusters, wherein each cluster comprises a plurality of assets sharing at least one component of intrinsic data; and store each clusters of similar assets in the training dataset.

16. The non-transitory computer readable medium of claim 9, further comprising instructions that cause the processor to:

identify one or more outliers of the training dataset, wherein outliers represent entries of training dataset where the labeled historical classification deviates from an actual classification of the corresponding physical asset at the time associated with the entry; and remove the one or more outliers from the training dataset.

17. A system comprising:

a plurality of computing devices comprising a provider device and at least one consumer device, the provider device configured to capture images; and an asset valuation platform configured to:

access a training dataset of training data, each entry of training data including an aggregation of intrinsic data extracted from a physical asset corresponding to the entry labeled by a historical classification and a time associated with the entry;

update the training data set with extrinsic data for each entry of the training dataset, wherein updating comprises:

identifying a range of time including a present time;

responsive to determining that an amount of entries of the training data set having a respective time associated with the entry during the range of time exceeds a threshold, identifying a set of extrinsic data for entries within the range of time and excluding entries that are outside of the range of time;

compiling the set of extrinsic data based on the intrinsic data, the extrinsic data acquired by web scraping data associated with the intrinsic data; and updating the entry with the extracted intrinsic data;

input the updated training dataset to a machine-learning model to determine a difference between an output of the machine-learning model and a corresponding label for each entry of the updated training dataset;

update parameter values of the machine-learning model based for principle components of the training data on the determined difference for each of the updated training dataset, wherein the machine-learning model is trained using the updated parameter values to output classifications of a physical asset based on one or more of: a subject of the physical asset, a time associated with the physical asset, and extrinsic data collected for the physical asset;

inputting a principal component vector to the updated machine-learning model, wherein the principal component vector comprises intrinsic data extracted from a physical asset and extrinsic data compiled for the physical asset; and receiving, as output from the updated machine-learning model, a classification of the physical asset corresponding to a present time.

18. The system of claim 17, wherein the asset valuation platform is further configured to:

identify one or more outliers of the training dataset, wherein outliers represent entries of training dataset where the labeled historical classification deviates from an actual classification of the corresponding physical asset at the time associated with the entry; and remove the one or more outliers from the training dataset.

* * * * *